(12) United States Patent
Bowman

(10) Patent No.: US 10,005,015 B2
(45) Date of Patent: Jun. 26, 2018

(54) ELECTROSTATIC FILTER AND METHOD OF INSTALLATION

(75) Inventor: Ronald L. Bowman, Golden, CO (US)

(73) Assignee: CARRIER CORPORATION, Farmington, CT (US)

( * ) Notice: Subject to any disclaimer, the term of this patent is extended or adjusted under 35 U.S.C. 154(b) by 0 days. days.

(21) Appl. No.: 14/119,045

(22) PCT Filed: May 14, 2012

(86) PCT No.: PCT/US2012/037759
§ 371 (c)(1),
(2), (4) Date: Nov. 20, 2013

(87) PCT Pub. No.: WO2012/162003
PCT Pub. Date: Nov. 29, 2012

(65) Prior Publication Data
US 2014/0109768 A1 Apr. 24, 2014

Related U.S. Application Data

(60) Provisional application No. 61/489,526, filed on May 24, 2011.

(51) Int. Cl.
*B03C 3/82* (2006.01)
*B01D 46/00* (2006.01)
(Continued)

(52) U.S. Cl.
CPC ...... *B01D 46/0002* (2013.01); *B01D 46/2411* (2013.01); *B01D 46/521* (2013.01);
(Continued)

(58) Field of Classification Search
CPC combination set(s) only.
See application file for complete search history.

(56) References Cited

U.S. PATENT DOCUMENTS

| 2,502,560 A | 4/1950 | Dahlman |
| 2,990,912 A | 7/1961 | Cole |

(Continued)

FOREIGN PATENT DOCUMENTS

| FR | 2940918 | * | 7/2010 |
| FR | 2940918 A3 | | 7/2010 |

(Continued)

OTHER PUBLICATIONS

Notification of Transmittal of the International Report on Patentability of the International Searching Authority, or the Declaration; PCT/US2012/037759; dated Nov. 26, 2013, 8 pages.

(Continued)

*Primary Examiner* — Robert A Hopkins
*Assistant Examiner* — Sonji Turner
(74) *Attorney, Agent, or Firm* — Cantor Colburn LLP

(57) ABSTRACT

An air filtration system includes a frame directing an airflow through the air filtration system and a media filter disposed in the frame including one or more filtration elements. The system further includes one or more alignment features and one or more sealing elements interactive with the one or more alignment features to prevent incorrect installation of the media filter into the frame. A method of installing a media filter in an air filtration system includes aligning an alignment feature of the media filter with an opening in a frame of the air filtration system and inserting the media filter into the frame. The alignment feature ensures that the media filter is inserted in the frame in a correct orientation.

6 Claims, 5 Drawing Sheets

(51) Int. Cl.
*B01D 46/24* (2006.01)
*B01D 46/52* (2006.01)

(52) U.S. Cl.
CPC .......... *B03C 3/82* (2013.01); *B01D 2265/026* (2013.01); *B03C 2201/28* (2013.01); *Y10T 29/49826* (2015.01)

(56) References Cited

U.S. PATENT DOCUMENTS

| | | | |
|---|---|---|---|
| 3,271,932 A | 9/1966 | Newell | |
| 3,626,668 A | 12/1971 | Cardiff | |
| 4,465,499 A | 8/1984 | Wawro et al. | |
| 4,595,401 A | 6/1986 | Witchell | |
| 4,792,344 A * | 12/1988 | Belcher | B01D 46/0075 55/299 |
| 4,853,005 A | 8/1989 | Jaisinghani et al. | |
| 4,878,149 A | 10/1989 | Stiehl et al. | |
| 4,940,470 A | 7/1990 | Jaisinghani et al. | |
| 5,330,559 A | 7/1994 | Cheney et al. | |
| 5,378,254 A * | 1/1995 | Maly | A61L 9/12 96/418 |
| 5,403,383 A * | 4/1995 | Jaisinghani | B03C 3/66 422/22 |
| 5,735,918 A | 4/1998 | Barradas | |
| 5,846,302 A | 12/1998 | Putro | |
| 5,935,281 A | 8/1999 | Rotheiser et al. | |
| 5,944,860 A * | 8/1999 | Mack | B01D 46/0005 55/492 |
| 6,126,708 A * | 10/2000 | Mack | B01D 46/0005 55/492 |
| 6,251,171 B1 | 6/2001 | Marra et al. | |
| 6,425,932 B1 * | 7/2002 | Huehn | B01D 46/0005 55/471 |
| 6,814,660 B1 | 11/2004 | Cavett | |
| 6,849,107 B1 | 2/2005 | Huffman | |
| 6,860,916 B2 | 3/2005 | Kubokawa et al. | |
| 7,067,939 B2 | 6/2006 | Hartmann et al. | |
| 7,141,198 B2 | 11/2006 | Stankowski et al. | |
| 7,156,898 B2 * | 1/2007 | Jaisinghani | B03C 3/09 264/257 |
| 7,160,363 B2 | 1/2007 | Kulmala et al. | |
| 7,212,393 B2 | 5/2007 | Gefter et al. | |
| 7,332,019 B2 * | 2/2008 | Bias | B03C 3/025 96/15 |
| 7,351,274 B2 * | 4/2008 | Helt | B03C 3/12 95/2 |
| 7,521,012 B2 | 4/2009 | Stankowski et al. | |
| 7,524,362 B2 | 4/2009 | Wu et al. | |
| 7,594,958 B2 | 9/2009 | Krichtafovitch et al. | |
| 7,815,720 B2 | 10/2010 | McKinney et al. | |
| 8,080,094 B2 | 12/2011 | Vanderginst | |
| 9,034,068 B2 * | 5/2015 | Ball | B01D 46/001 55/483 |
| 9,370,741 B2 * | 6/2016 | Horey | B01D 46/009 |
| 2002/0152890 A1 * | 10/2002 | Leiser | B03C 3/155 95/63 |
| 2003/0071521 A1 | 4/2003 | Hartmann et al. | |
| 2004/0004797 A1 | 1/2004 | Krichtafovitch et al. | |
| 2004/0074387 A1 * | 4/2004 | Jaisinghani | B03C 3/09 95/63 |
| 2005/0284116 A1 * | 12/2005 | Duffy | B01D 46/0001 55/497 |
| 2006/0150816 A1 * | 7/2006 | Jaisinghani | B03C 3/09 96/67 |
| 2006/0180023 A1 | 8/2006 | Coppom et al. | |
| 2006/0236667 A1 * | 10/2006 | Terlson | B01D 46/0002 55/498 |
| 2007/0039462 A1 * | 2/2007 | Helt | B03C 3/12 95/6 |
| 2007/0039472 A1 * | 2/2007 | Bias | B03C 3/025 96/66 |
| 2008/0156186 A1 | 7/2008 | McKinney | |
| 2009/0025402 A1 | 1/2009 | Mello et al. | |
| 2009/0183474 A1 * | 7/2009 | Workman | B01D 46/0005 55/385.2 |
| 2009/0183477 A1 * | 7/2009 | Workman | B01D 46/0002 55/495 |
| 2009/0183636 A1 * | 7/2009 | Levine | B01D 46/10 96/397 |
| 2010/0236205 A1 * | 9/2010 | Braithwaite | B01D 46/10 55/499 |
| 2010/0251895 A1 | 10/2010 | Vanderginst | |
| 2011/0006216 A1 | 1/2011 | Searle | |
| 2011/0219954 A1 | 9/2011 | McKinney | |
| 2014/0096680 A1 | 4/2014 | Ackley et al. | |

FOREIGN PATENT DOCUMENTS

| | | | |
|---|---|---|---|
| WO | 2010085253 A1 | 7/2010 | |
| WO | WO 2010085253 A1 * | 7/2010 | B03C 3/017 |

OTHER PUBLICATIONS

Notification of Transmittal of the International Search Report and the Written Opinion of the International Searching Authority, or the Declaration; PCT/US2012/037759; dated Sep. 25, 2012.

\* cited by examiner

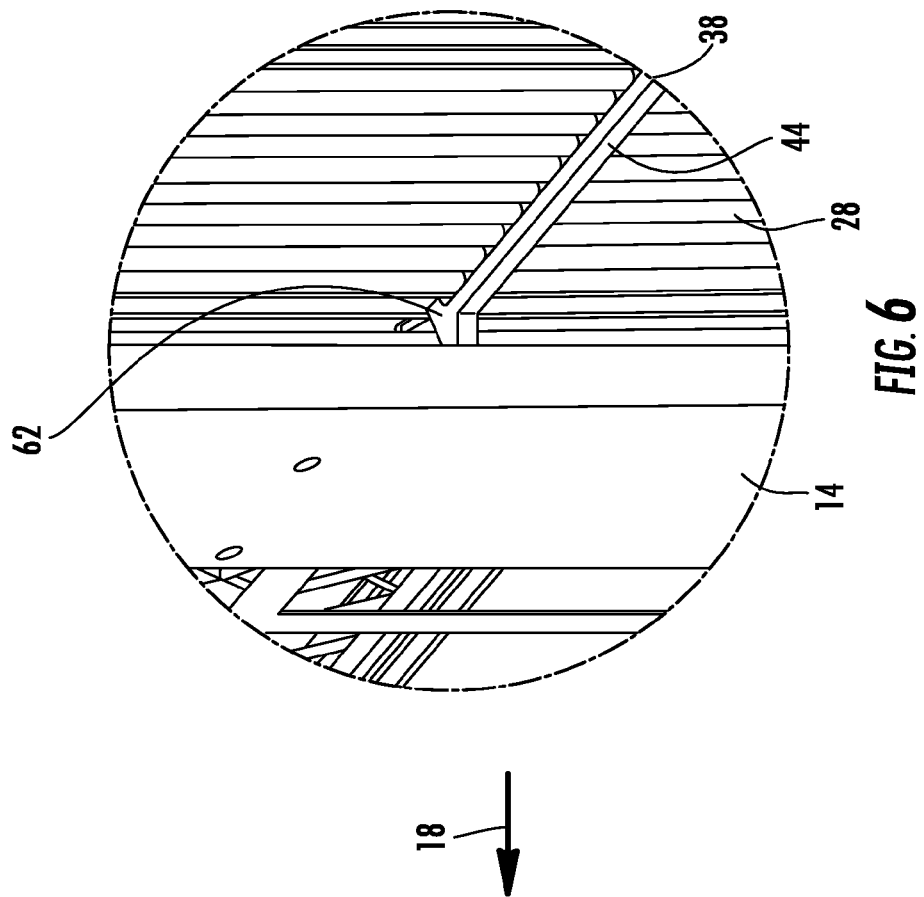
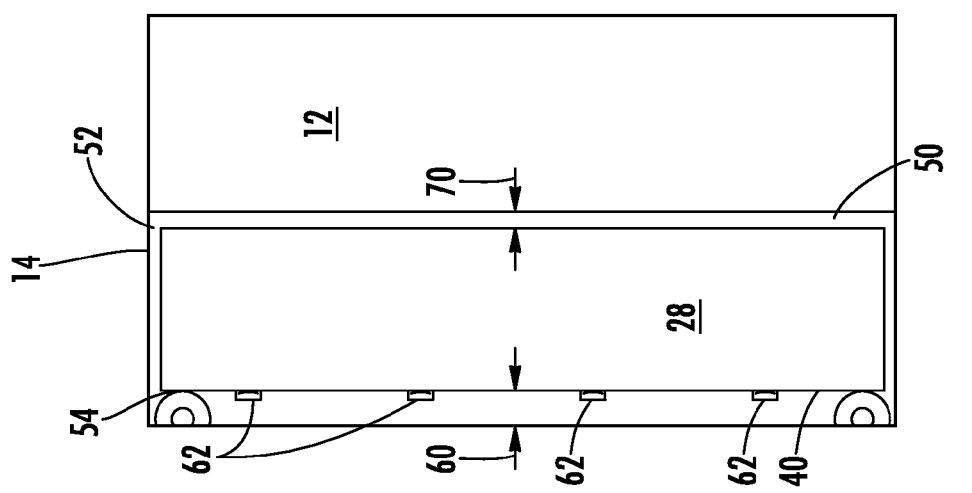

ELECTROSTATIC FILTER AND METHOD OF INSTALLATION

BACKGROUND OF THE INVENTION

The subject matter disclosed herein relates to air filtration systems. More specifically, filters for electrostatic air filtration systems and installation thereof.

In air filtration systems, for example, electrically enhanced air filtration systems, electrostatic filters installed in the systems collect impurities in an airflow through the system before the airflow is circulated through a space such as a home or other building. Such filters are periodically removed and replaced as their effectiveness diminishes. In some systems, improper filter installation, or installation of an incorrect filter as a replacement can result in reduced effectiveness of the filter and the filtration system, and in some cases safety issues.

BRIEF DESCRIPTION OF THE INVENTION

According to one aspect of the invention, a media filter for an air filtration system includes a filtration element and one or more alignment features. The one or more alignment features are interactive with one or more sealing elements of the air filtration system to prevent incorrect installation of the media filter into the air filtration system.

According to another aspect of the invention, an air filtration system includes a frame directing an airflow through the air filtration system and a media filter located in the frame including one or more filtration elements. The system further includes one or more alignment features and one or more sealing elements interactive with the one or more alignment features to prevent incorrect installation of the media filter into the frame.

According to yet another aspect of the invention, a method of installing a media filter in an air filtration system includes aligning an alignment feature of the media filter with an opening in a frame of the air filtration system and inserting the media filter into the frame. The alignment feature ensures that the media filter is inserted in the frame in a correct orientation.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 5 is a view of an embodiment of a media filter being installed in an air filtration system;

FIG. 6 is a enlarged view of the circled portion of FIG. 5;

The detailed description explains embodiments of the invention, together with advantages and features, by way of example with reference to the drawings.

DETAILED DESCRIPTION OF THE INVENTION

Figure 1:
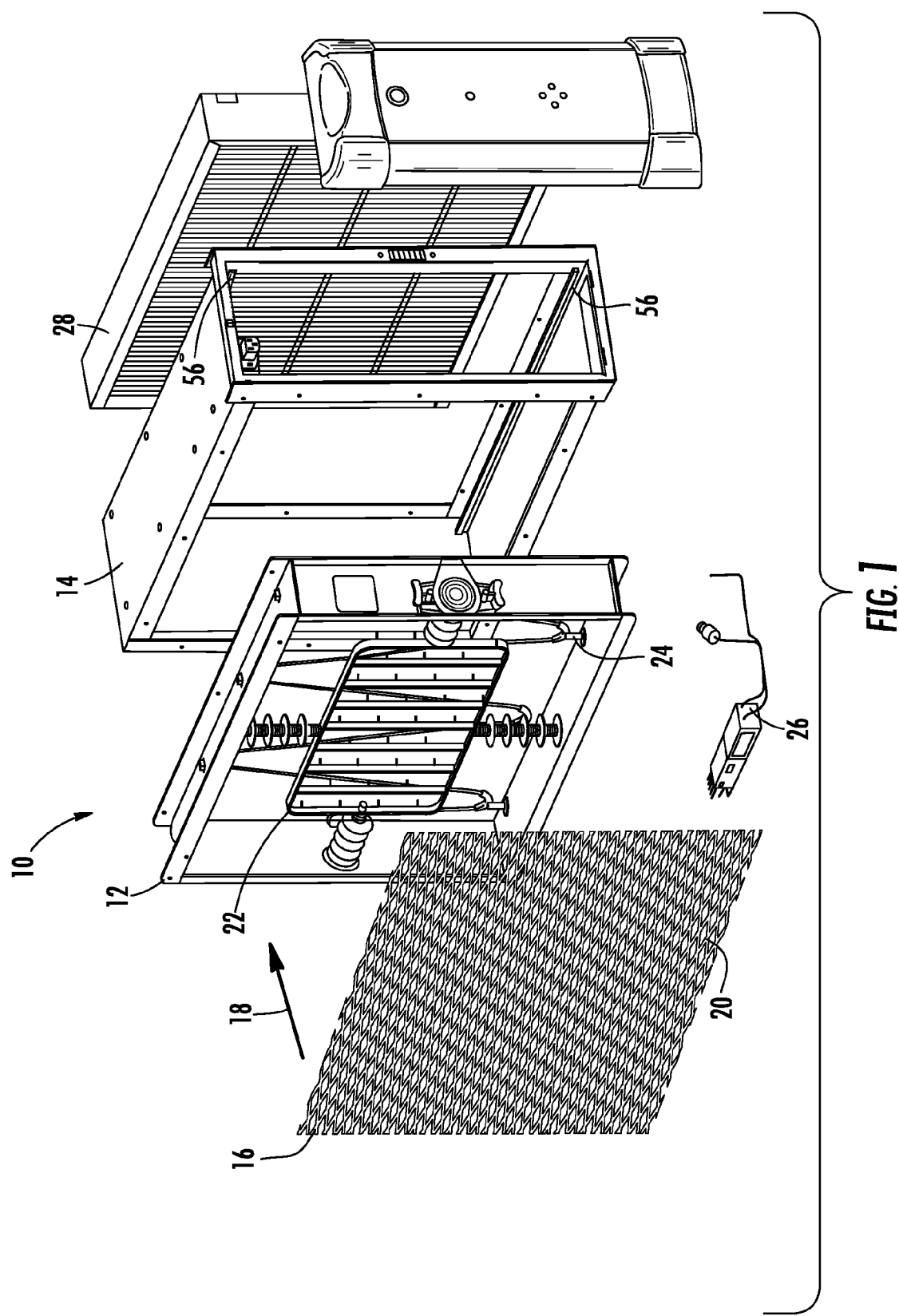
FIG. 1 schematically illustrates an embodiment of an air filtration system.

Shown in FIG. 1 is a view of an embodiment of an air filtration system 10. The air filtration system 10 of FIG. 1 is an electrically enhanced air filtration system 10, but it is to be appreciated that utilization of the present invention with other types of air filtration systems 10 having replaceable filters is contemplated within the present scope.

The air filtration system 10 includes a filter enhancement module (FEM) 12, shown in FIG. 1. At an upstream end 16 of the FEM 12, relative to an airflow direction 18 of air through the filtration system 10 is a safety screen 20 which also acts as an upstream ground for the FEM 12. Downstream of the safety screen 20 is an ionization array 22, and a field-generating array 24 located downstream of the ionization array 22. The ionization array 22 is an array of points sufficiently sharp such as to produce corona discharge when a pre-determined voltage is applied. For example, the ionization array may comprise a plurality of thin wires, barbed wires, or any structure capable of producing the corona needed to yield ions. The field-generating array 24 and the ionization array 22 are both connected to and powered by a high voltage power supply 26. The FEM 12 is located and secured in a frame 14 of the filtration system 10. A media filter 28 is disposed in the frame 14 downstream of the field-generating array 24.

Figure 2:
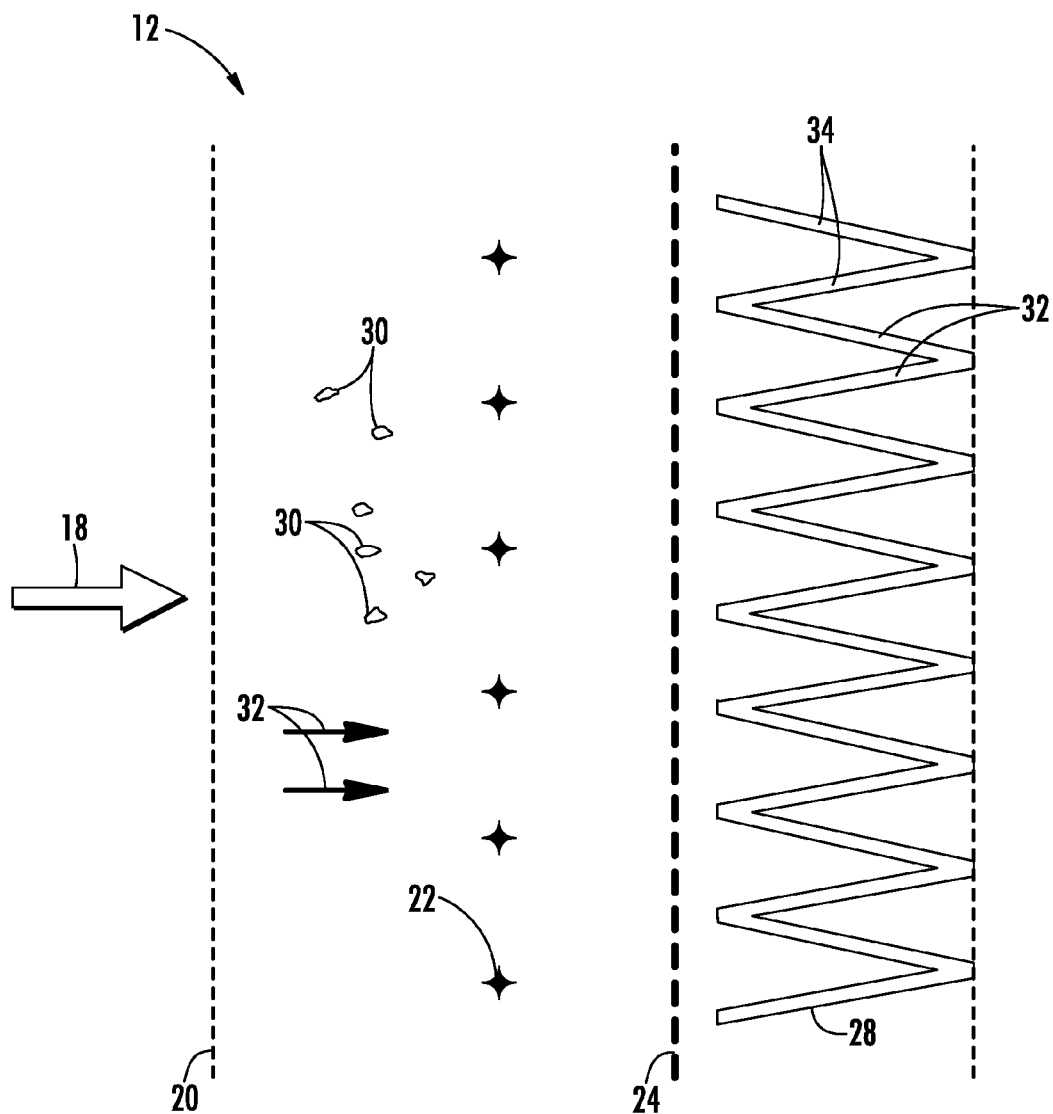
FIG. 2 is a schematic cross-sectional view of an embodiment of an air filtration system.

Referring now to FIG. 2, when the power supply 26 is activated, the ionization array 22 ionizes particles 30 in an airstream 32 passing through the FEM 12. The voltage across the field-generating array 24 polarizes media fibers 34 of the media filter 28, which causes the ionized particles 30 to be attracted to and captured by the media fibers 34.

Figure 3:
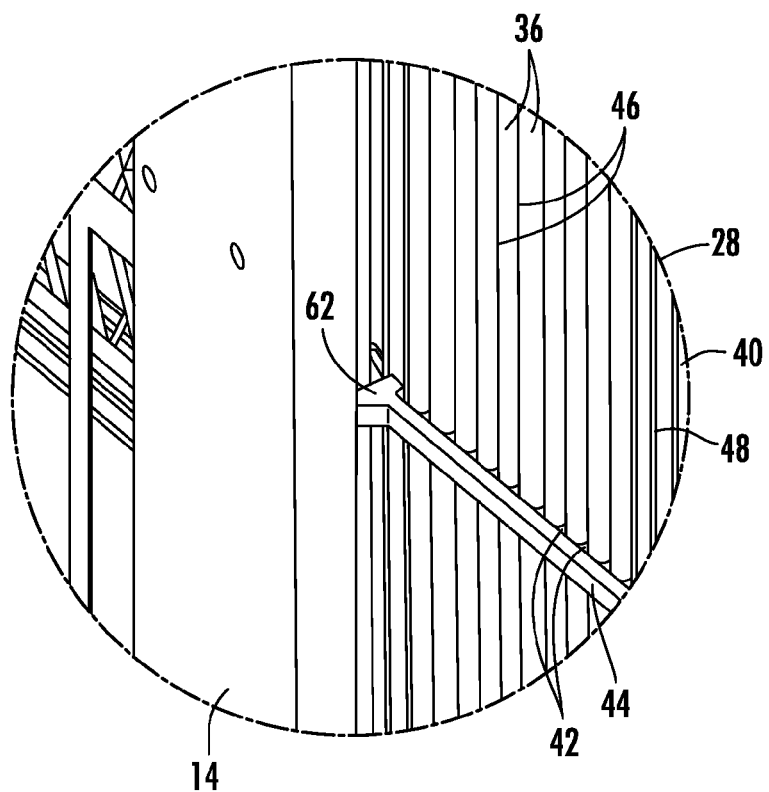
FIG. 3 is a schematic view of an embodiment of a media filter for an air filtration system.
Figure 4:
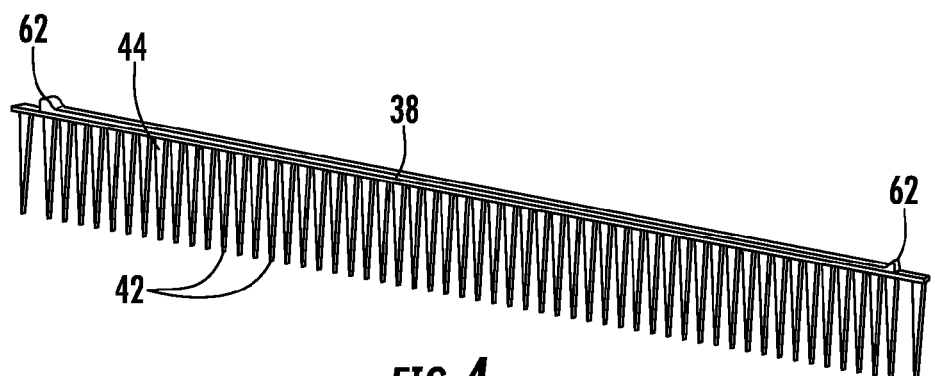
FIG. 4 illustrates an embodiment of a comb for a media filter if an air filtration system.

The media filter 28 comprises the plurality of media fibers 34 arranged in a plurality of pleats 36. One or more combs 38 are inserted in the media filter 28 from a downstream side 40 of the media filter 28 to separate the pleats 36 and to keep the pleats 36 from collapsing. As shown in FIG. 4, the comb 38 includes a plurality of comb teeth 42 extending from a spine 44. Referring again to FIG. 3, the comb 38 is inserted into the media filter 28 such that the comb teeth 42 extend between adjacent pleats 36 of the plurality of pleats 36 to keep the adjacent pleats 36 separated.

In some embodiments, the media filter 28 must be placed in close proximity to the field-generating array 24 so the desired electrical field is generated in the media fibers 34. The media filter 28 thus contacts or has a small gap to the field generating array 24. Further, the media filter 28 is configured to have a grounded downstream side 40. In some embodiments, the downstream side 40 of the media filter 28 includes a carbon paint on tips 46 of the plurality of pleats 36 to create a grounding plane 48 at the downstream side 40. During the operational life of the filtration system 10, the media filter 28 is often replaced with a replacement media filter 28. Because of the unique features of an upstream side and the downstream side 40 of the media filter 28, it is imperative that the replacement media filter 28 is installed in the correct orientation. Such correct orientation of the media filter 28 is critical to the operation and function of the electrically-enhanced air filtration system 10.

Figure 8:
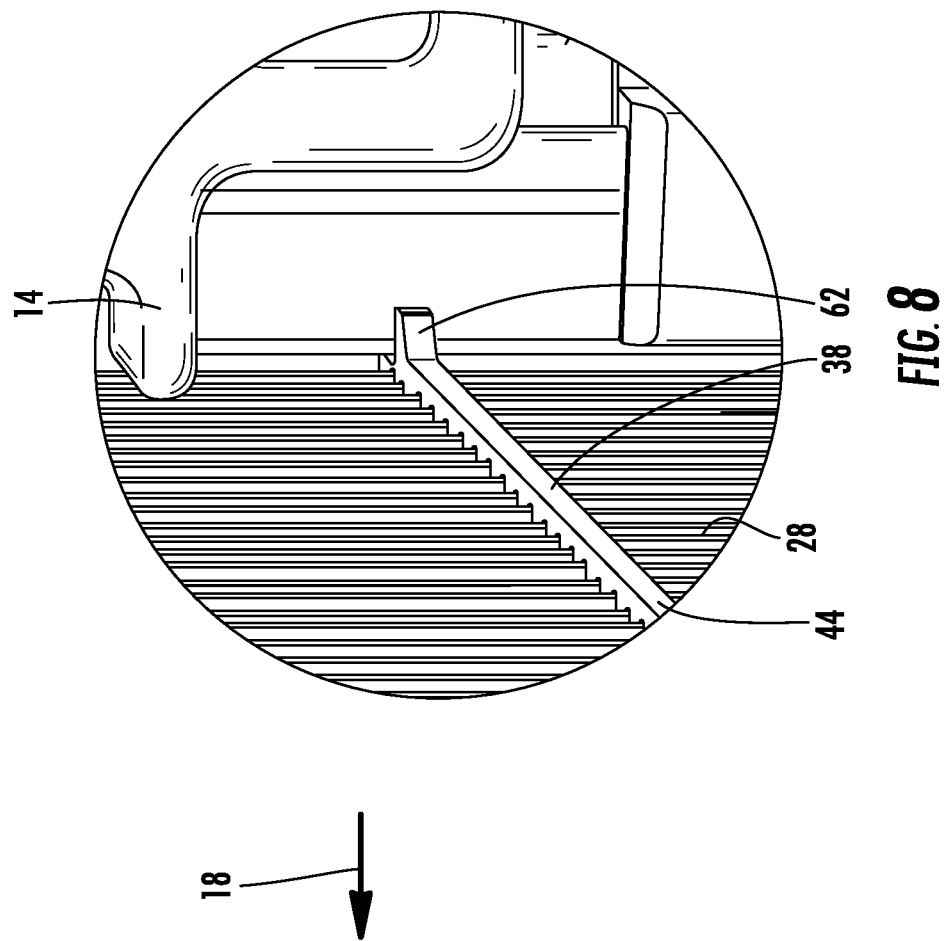
FIG. 8 is an enlarged view of the circled portion of FIG. 7.
Figure 7:
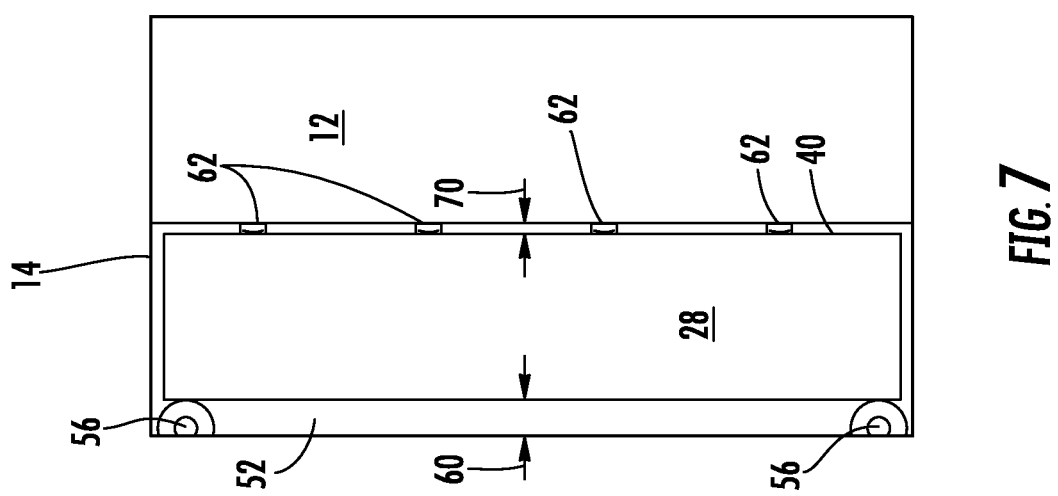
FIG. 7 is a view of an embodiment of a media filter being incorrectly installed in an air filtration system.

Referring to FIG. 5, the media filter 28 is slidable into a filter opening 52 in the frame 14. When installed, a downstream filter frame 54 contacts an air sealing element 56 protruding from the frame 14 and extending substantially along an insertion direction of the media filter 28. The contact between the sealing element 56 and the media filter 28 prevents the airstream 32 from moving around the media filter 28, forcing the airstream 32 through the media filter 28. Thus, when the media filter 28 is properly installed in the frame 14, because of the presence of the sealing element 56, a downstream filter gap 60 between the downstream side 40 and the frame 14 is larger than an upstream filter gap 70 between the upstream side 50 and the field-generating array 24 and/or frame 14. As shown in FIG. 6, the comb 38 includes one or more tabs 62, or other similar features, extending from the spine 44 in a substantially downstream direction. The tabs 62 are configured such that when the media filter 28 is oriented correctly at installation, as the media filter 28 is moved into the filter opening 52, the tabs 62 do not interfere with the frame 14, thus allowing installation of the media filter 28. If, however, as shown in FIGS. 7 and 8, a user attempts to install the media filter 28 with the downstream side 40 facing an upstream direction, the tabs 62 interfere with field-generating array 24 and/or the frame 14, thus not allowing the media filter 28 to be installed in this incorrect orientation. The presence of the sealing element 56 at the downstream side causes the creation of the downstream filter gap 60 which allows for passage of the tabs 62 past the frame 14 allowing for full installation of the media filter 28.

In some embodiments, further sealing elements may be included which are located substantially perpendicular to the insertion direction of the media filter 28. In the embodiment described above, the additional sealing elements are located either on the ends of the media filter 28 or on the downstream side 40 of the media filter 28 to ensure creation of the downstream filter gap 60 by the sealing elements 56.

The sealing elements 56 described herein may be of any suitable cross-sectional shape including, for example, fin seals or bulb seals. It is to be appreciation that these configurations are merely exemplary and other cross-sectional shapes are within the scope of the present disclosure.

In other embodiments, the configuration may be substantially reversed. In such embodiments, the protruding or raised sealing element 56 is located at the media filter 28 and the tabs 62 or other alignment features are located at the frame 14. Similar to the embodiment described above, attempting to install a media filter 28 incorrectly will result in interference between the media filter 28 and the tabs 62, thus not allowing the installation to be completed. Further, additional sealing elements perpendicular to the insertion direction of the media filter 28 may be included and located on the frame 14.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A media filter for an air filtration system comprising:
a filtration element;
one or more alignment features secured to the filtration element, the one or more alignment features extending downstream of a downstream face of the filtration element, relative to a direction of airflow through an air filtration system; and
a ground plane disposed at a downstream side of the media filter;
wherein the one or more alignment features are configured such that the media filter is installable into a frame when the media filter is installed in the frame with the one or more alignment features extending downstream relative to the direction of airflow through the air filtration system, and such that the one or more alignment features interfere with one or more elements of the air filtration system when an attempt is made to install the media filter into the frame with the one or more alignment features extending upstream relative to the direction of airflow.

2. The media filter of claim 1, wherein the one or more alignment features comprise one or more tabs extending from the downstream face of the filtration element.

3. The media filter of claim 1, further comprising:
a plurality of media fibers arranged in a plurality of pleats; and
one or more combs including:
a spine; and
a plurality of comb teeth extending from the spine and insertable between adjacent pleats of the plurality of pleats;
wherein the one or more alignment features extend from the spine.

4. An air filtration system comprising:
a frame directing an airflow through the air filtration system;
a media filter disposed in the frame including one or more filtration elements; and
one or more alignment features secured to the media filter, the one or more alignment features extending downstream of a downstream face of the media filter, relative to a direction of airflow through the air filtration system;
wherein the one or more alignment features are configured such that the media filter is installable into the frame when the media filter is installed in the frame with the one or more alignment features extending downstream relative to the direction of airflow through the air filtration system, and such that the one or more alignment features interfere with one or more elements of the air filtration system when an attempt is made to install the media filter into the frame with the one or more alignment features extending upstream relative to the direction of airflow;
wherein the media filter is electrically polarized via proximity to a field-generating array disposed directly upstream of the media filter.

5. An air filtration system comprising:
a frame directing an airflow through the air filtration system;
a media filter disposed in the frame including one or more filtration elements; and
one or more alignment features secured to the media filter, the one or more alignment features extending downstream of a downstream face of the media filter, relative to a direction of airflow through the air filtration system;

wherein the one or more alignment features are configured such that the media filter is installable into the frame when the media filter is installed in the frame with the one or more alignment features extending downstream relative to the direction of airflow through the air filtration system, and such that the one or more alignment features interfere with one or more elements of the air filtration system when an attempt is made to install the media filter into the frame with the one or more alignment features extending upstream relative to the direction of airflow; and an ionization array disposed upstream of a field-generating array of the air filtration system.

6. The air filtration system of claim 4, wherein the media filter comprises a ground plane disposed at a downstream side of the media filter.

* * * * *